(12) United States Patent
Moendel et al.

(10) Patent No.: US 7,192,057 B2
(45) Date of Patent: Mar. 20, 2007

(54) DEFLECTION FITTING FOR A SAFETY BELT

(75) Inventors: Karl Moendel, Gmuend (DE); Gerhard Malbrich, Gschwend (DE)

(73) Assignee: TRW Automotive GmbH, Alfdorf (DE)

( * ) Notice: Subject to any disclaimer, the term of this patent is extended or adjusted under 35 U.S.C. 154(b) by 262 days.

(21) Appl. No.: 10/878,468

(22) Filed: Jun. 28, 2004

(65) Prior Publication Data
US 2005/0012321 A1     Jan. 20, 2005

(30) Foreign Application Priority Data
Jul. 17, 2003     (DE) ................. 103 32 535

(51) Int. Cl.
*B60R 22/00* (2006.01)

(52) U.S. Cl. ............. 280/808; 280/801.1; 297/468

(58) Field of Classification Search ............ 280/808, 280/801.1, 801.2; 297/468
See application file for complete search history.

(56) References Cited

U.S. PATENT DOCUMENTS

| 4,579,368 | A | * | 4/1986 | Kawade et al. | .......... 280/801.2 |
| 5,513,880 | A | * | 5/1996 | Ohira et al. | ............ 280/808 |
| 5,601,311 | A | * | 2/1997 | Pfeiffer et al. | .......... 280/801.1 |
| 6,003,951 | A | * | 12/1999 | Hennig et al. | ............. 297/483 |
| 6,106,012 | A | * | 8/2000 | Boegge et al. | ........... 280/801.1 |
| 6,290,259 | B1 | * | 9/2001 | Drobot et al. | ............. 280/808 |
| 6,533,322 | B2 | * | 3/2003 | Janz | .......................... 280/808 |
| 6,929,286 | B2 | * | 8/2005 | Bertelle et al. | ............ 280/808 |
| 2003/0080547 | A1 | | 5/2003 | Janz | |

FOREIGN PATENT DOCUMENTS

| DE | 8611961 | 9/1986 |
| DE | 19515562 | 10/1996 |
| DE | 19841328 | 4/2000 |
| DE | 10153062 | 4/2003 |
| EP | 180306 A2 * | 5/1986 |

* cited by examiner

*Primary Examiner*—Ruth Ilan
*Assistant Examiner*—Tiffany Webb
(74) *Attorney, Agent, or Firm*—Tarolli, Sundheim, Covell & Tummino LLP

(57) ABSTRACT

A deflection fitting for a safety belt includes a carrier plate (10) having an installation opening (18) and an eye (20) for the safety belt to pass through. The deflection fitting further includes a covering (12) of plastic, adapted to the installation situation of the deflection fitting, to form an edge for the carrier plate (10). The deflection fitting further includes an adapter (14) of plastic having a collar portion (28) inserted into the installation opening (18) and a delimiting portion (30) inserted into the eye (20). The covering (12) is constructed as a component made of a single piece, which surrounds the lower and the lateral outer edge regions of the carrier plate (10).

6 Claims, 3 Drawing Sheets

DEFLECTION FITTING FOR A SAFETY BELT

FIELD OF THE INVENTION

The invention relates to a deflection fitting for a safety belt.

BACKGROUND OF THE INVENTION

From German Patent Specification DE 101 53 062 C1 a deflection fitting for a safety belt is known, comprising a carrier plate having an installation opening and an eye for the safety belt to pass through, a covering of plastic adapted to the installation situation of the deflection fitting to form an edge of the carrier plate, and an adapter of plastic which has a collar portion inserted into the installation opening and a delimiting portion inserted into the eye. This type of deflection fitting has the advantage that the carrier plate can be constructed as a standard component, because the adaptation to the actual installation situation in a vehicle takes place exclusively by means of the development of the covering. In the deflection fitting shown in DE 101 53 062 C1, two half-portions of plastic are provided, which are pushed laterally onto an edge portion of the carrier plate and are coupled to each other by means of a plug connection.

SUMMARY OF THE INVENTION

The invention provides a deflection fitting which is able to be produced at a more favourable cost and has a longer durability.

A deflection fitting according to the invention comprises a carrier plate having an installation opening and an eye for the safety belt to pass through. The deflection fitting according to the invention further comprises a covering of plastic adapted to the installation situation of the deflection fitting to form an edge of the carrier plate. The deflection fitting according to the invention further comprises an adapter of plastic which has a collar portion inserted into the installation opening, and a delimiting portion inserted into the eye. The covering of the deflection fitting according to the invention is constructed as a component made of a single piece, which surrounds the lower and the lateral outer edge regions of the carrier plate. The provision of a covering in a single piece reduces the number of components and hence also the number of extrusion dies necessary for the production of the deflection fitting. The number of installation steps is likewise reduced, because only one part has to be fixed to cover the carrier plate. Furthermore, the deflection fitting according to the invention does not have a plug connection site or the like in the belt band region, so that a slipping off of the covering from the carrier plate though an unintentional opening of such a plug connection is ruled out. Through the possibility of constructing the covering in a flexible manner, the deflection fitting according to the invention is suitable both for a concealed and also for a visible installation.

The covering can preferably be clipped onto the carrier plate as a finished part, or alternatively can be injection-molded directly onto the carrier plate.

DETAILED DESCRIPTION OF THE PREFERRED EMBODIMENTS

Figure 1:
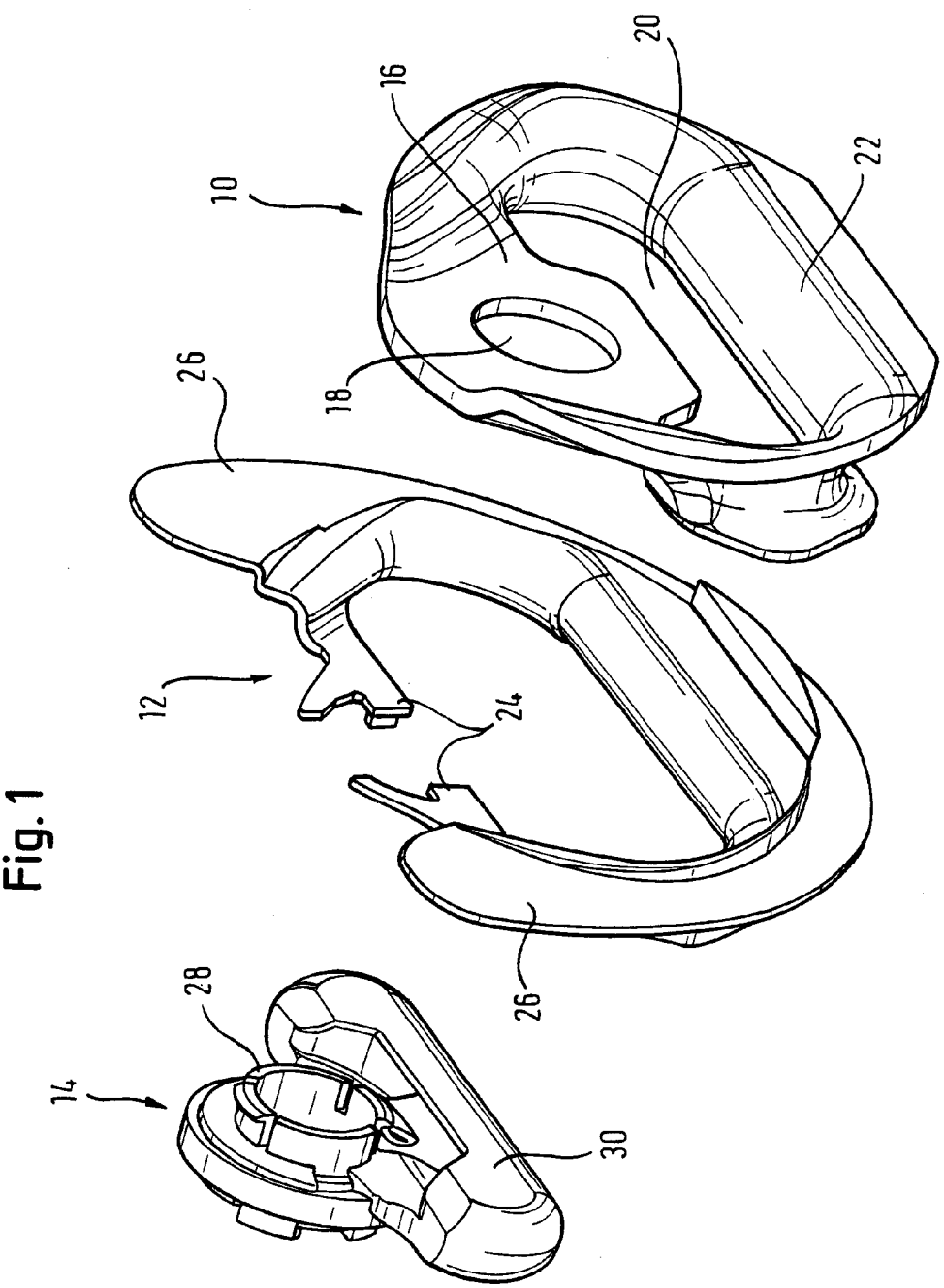
FIG. 1 shows a perspective exploded view of a deflection fitting according to the invention.

The deflection fitting for a safety belt, as illustrated in the figures, comprises substantially three components: A carrier plate 10, a covering 12 and an adapter 14. In all the embodiments, the carrier plate 10 is a standard component independent of the actual installation situation of the deflection fitting. The carrier plate 10 has an opening 18 formed in an installation section 16 and an elongated eye through which the safety belt can be passed. The region of the carrier plate 10 surrounding the eye 20 on the lower and on the lateral edges forms a guide section 22 with a running surface for the safety belt.

Figure 2:
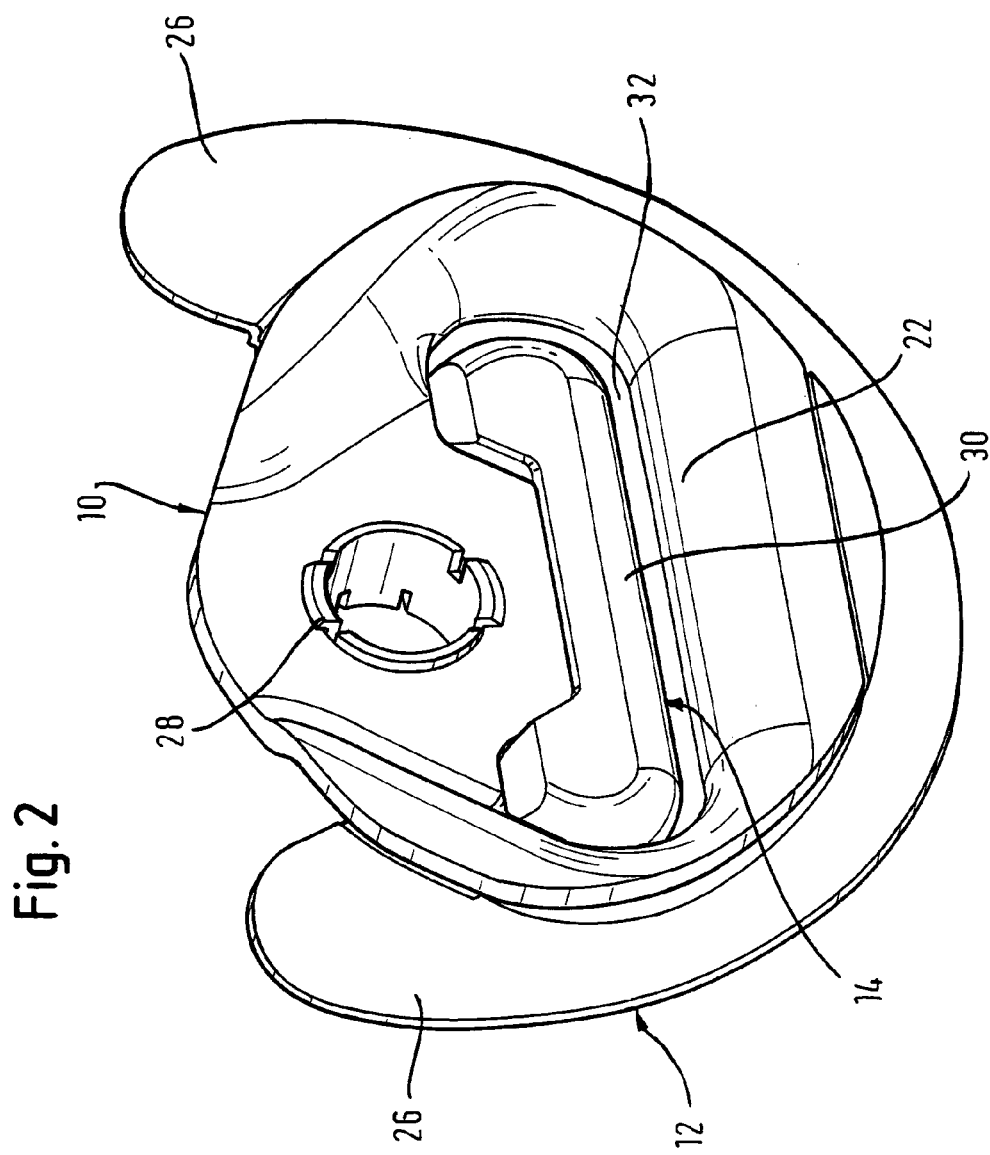
FIG. 2 shows a perspective front view of the deflection fitting.
Figure 3:
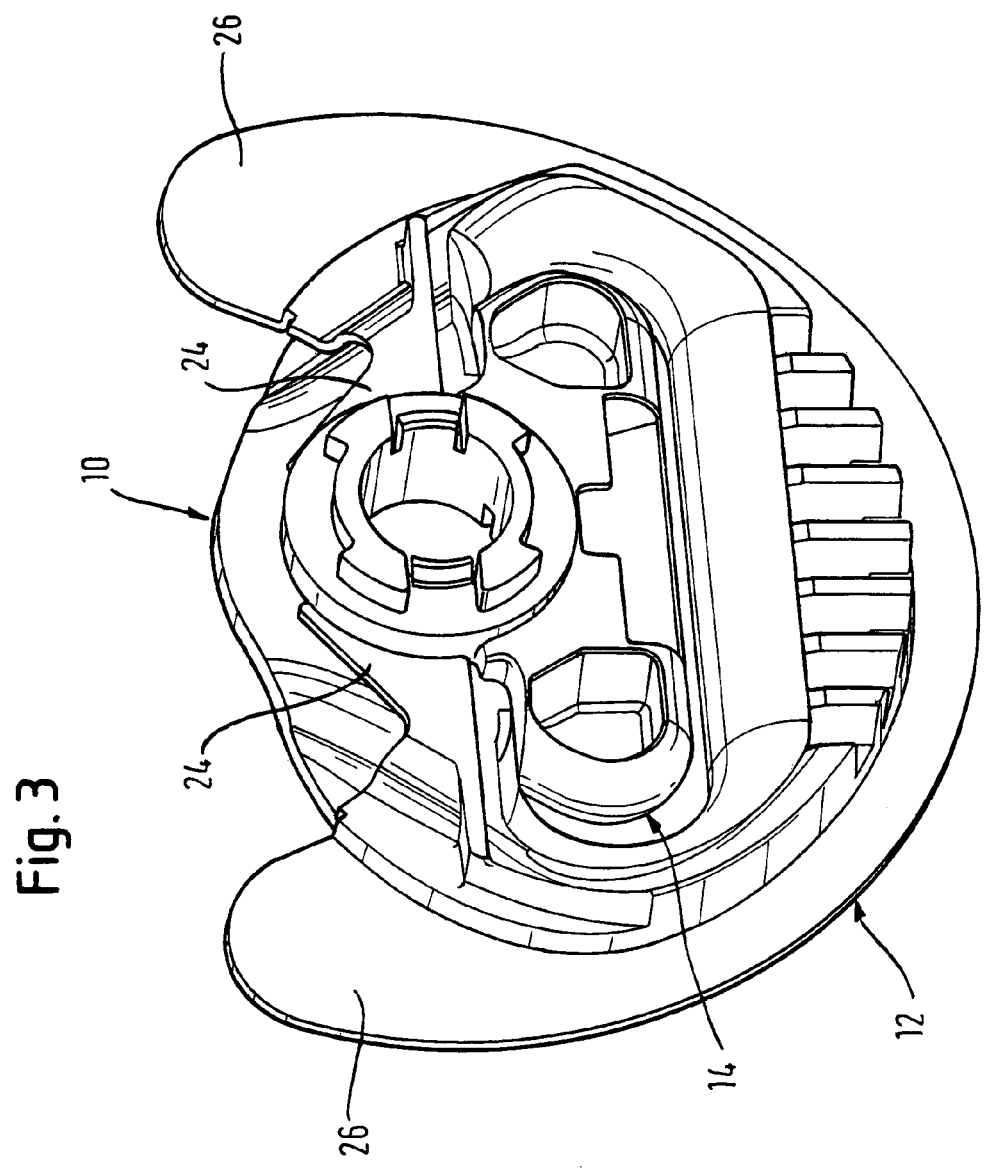
FIG. 3 shows a perspective rear view of the deflection fitting.

In the assembled state the covering 12, constructed in one piece, forms an edge for the carrier plate 10 surrounding the lower and the lateral outer edge regions of the carrier plate 10 (see FIGS. 2 and 3). The covering 12 has two holding portions 24 (see FIG. 3) resting on the installation section 16 of the carrier plate 10, and two laterally projecting shields 26. The shape of the covering 12, in particular that of the shields 26, is adapted to the actual installation situation in the vehicle. The covering 12 is constructed as an injection-molded plastic part which is clipped onto the carrier plate 10.

The deflection fitting according to the invention is completed by the adapter 14, which has a bush-like collar portion 28 and a bead-like delimiting portion 30. In the assembled state of the deflection fitting, the collar portion 28 and the delimiting portion 30 are inserted into the installation opening 18 or in the upper region of the belt eye 20 of the carrier plate 10. The delimiting portion 30 of the adapter 14 delimits the dimensions of the eye 20 in the region facing the belt guide portion 22 and thus establishes a defined slit 32 for the safety belt. The adapter 14, like the covering 12, is a plastic part which is clipped onto the carrier plate 10, the adapter 14 fixing the covering 12 on assembly of the deflection fitting.

In an alternative embodiment, the covering 12 is not clipped on, but rather is applied directly onto the carrier plate 10 by means of an injection-molding process. The adapter 14 can also be injection-molded directly onto the carrier plate 10.

The two plastic parts (covering 12 and adapter 14) are designed so that in the installed state they delimit the swiveling movement of the deflection fitting.

The invention claimed is:

1. A deflection fitting for a safety belt, comprising
a carrier plate (10) having an installation opening (18) and an eye (20) for the safety belt to pass through,
a covering (12) made of plastic, installed with the deflection fitting, to form an edge of the carrier plate (10), and
an adapter (14) made of plastic, having a collar portion (28) inserted into the installation opening (18) and a delimiting portion (30) inserted into the eye (20), characterized in that
the covering (12) is constructed as a component made of a single piece, which surrounds lower and lateral outer edge regions of the carrier plate (10).

2. The deflection fitting according to claim 1, characterized in that the covering (12) is clipped onto the carrier plate (10).

3. The deflection fitting according to claim 1, characterized in that the covering (12) is injection-molded onto the carrier plate (10).

4. The deflection fitting according to claim 1, characterized in that the adapter (14) is clipped onto the carrier plate (10).

5. The deflection fitting according to claim 1, characterized in that the adapter (14) is injection-molded onto the carrier plate (10).

6. The deflection fitting according to claim 1, characterized in that the adapter (14) fixes the covering (12) on the carrier plate (10).

* * * * *